United States Patent
Schrage (10) Patent No.: US 11,276,124 B2
(45) Date of Patent: Mar. 15, 2022

(54) MACHINE LEARNING-BASED TECHNIQUES FOR DETECTING PAYROLL FRAUD

(71) Applicant: SAP SE, Walldorf (DE)

(72) Inventor: Jan Schrage, Helmstadt-Bargen (DE)

(73) Assignee: SAP SE, Walldorf (DE)

( * ) Notice: Subject to any disclaimer, the term of this patent is extended or adjusted under 35 U.S.C. 154(b) by 226 days.

(21) Appl. No.: 16/460,541

(22) Filed: Jul. 2, 2019

(65) Prior Publication Data
US 2021/0004915 A1    Jan. 7, 2021

(51) Int. Cl.
*G06Q 40/00*    (2012.01)
*G06N 20/00*    (2019.01)

(52) U.S. Cl.
CPC .......... *G06Q 40/125* (2013.12); *G06N 20/00* (2019.01)

(58) Field of Classification Search
CPC ....... G06Q 40/125; G06Q 40/00; G06N 20/00
USPC .......................................................... 705/32
See application file for complete search history.

(56) References Cited

U.S. PATENT DOCUMENTS

| | | | |
|---|---|---|---|
| 5,819,226 A * | 10/1998 | Gopinathan | G06Q 20/00 705/44 |
| 10,019,744 B2 * | 7/2018 | Adjaoute | G06Q 30/0609 |
| 10,068,235 B1 * | 9/2018 | Boates | G06Q 20/4093 |
| 10,339,608 B1 * | 7/2019 | Haitz | G06Q 10/0635 |
| 10,402,396 B2 * | 9/2019 | Htun | G06F 21/552 |
| 10,789,643 B1 * | 9/2020 | Chang | G06F 17/18 |
| 10,803,533 B2 * | 10/2020 | Drangmeister | G06Q 40/125 |
| 11,019,063 B2 * | 5/2021 | Legault | G06N 20/00 |
| 11,037,229 B2 * | 6/2021 | Zoldi | G06Q 20/4016 |
| 11,049,109 B1 * | 6/2021 | Kramme | G06K 9/00442 |
| 11,055,727 B1 * | 7/2021 | Kumar | H04W 12/12 |
| 11,063,972 B2 * | 7/2021 | Ballai | H04M 15/47 |
| 11,087,334 B1 * | 8/2021 | McEachern | H04L 51/046 |
| 11,094,166 B2 * | 8/2021 | Higgins | G07F 17/3239 |
| 2012/0109821 A1 * | 5/2012 | Barbour | G06Q 40/02 705/44 |
| 2015/0046181 A1 * | 2/2015 | Adjaoute | G06N 5/04 705/2 |
| 2017/0270526 A1 * | 9/2017 | Fitzgerald | G06Q 40/123 |
| 2020/0098055 A1 * | 3/2020 | O'Hara | G06N 5/046 |

* cited by examiner

*Primary Examiner* — Andrew Joseph Rudy
(74) *Attorney, Agent, or Firm* — Fountainhead Law Group P.C.

(57) ABSTRACT

Computer-implemented machine learning (ML)-based techniques for detecting payroll fraud are provided. In one set of embodiments, these techniques employ a number of ML algorithms to evaluate different types of fraud-relevant data in different ways, such as outliers in salary increases, payment patterns, and so on. In some cases, the ML algorithms may be chained such that the output of one ML algorithm feeds as input into another. The results of these ML algorithms (or chains of algorithms) are fed into a neural network-based final evaluation engine that outputs an indication of whether a given employee is suspicious and should be audited as a potential payroll fraud case.

20 Claims, 9 Drawing Sheets

MACHINE LEARNING-BASED TECHNIQUES FOR DETECTING PAYROLL FRAUD

BACKGROUND

Payroll fraud, which is the theft of money from an organization via its payroll system, is a significant problem for organizations worldwide. Globally, a loss of $7.2 billion annually is estimated to be caused by this type of fraud.

Existing computerized audit systems that are designed to detect possible payroll fraud generally operate according to fixed rules such as "flag all employees with a salary increase greater than 10%." However, this approach suffers from a number of limitations. First, it cannot react to changes in the situation or assumptions underlying the rules (e.g., inflation changes that affect the sizes of base salary increases). Second, this approach tends to produce too much data (e.g., too many false positives), which makes it difficult for auditors to sift through the data and find actual fraud cases. Third, this approach cannot identify unexpected patterns in data that may be indicative of fraud. Instead, it is restricted to the exact rules that the system designers have come up with, and thus cannot react to new and imaginative fraud schemes.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

Embodiments of the present disclosure are directed to computer-implemented, machine learning (ML)-based techniques for detecting possible payroll fraud. At a high level, these techniques employ a variety of ML algorithms to evaluate different types of data that may be relevant to payroll fraud (e.g., payroll data, human resources (HR) data, banking data, etc.) in different ways, such as outliers in salary increases, payment patterns, and so on. In some cases, the ML algorithms may be chained such that the output of one ML algorithm feeds as input into another. The results of these ML algorithms (or chains of algorithms) are fed into a neural network-based final evaluation engine that outputs an indication of whether a given employee is suspicious and should be audited as a potential payroll fraud case.

With this ML-based approach, it is possible to evaluate data for fraud detection purposes in a far more flexible and dynamic manner than the fixed rule-based approach. For example, through the configuration and use of appropriate ML algorithms, an extraordinary payment to an employee in March can be considered a non-suspicious event if it fits within a larger overall payment pattern for the organization. A fixed rule that simply looks for 10% larger payments on a month to month basis would flag that employee (and all other similar employees) in this case. As another example, a salary increase for an employee in a relatively high inflation country can be evaluated on different terms than a salary increase for an employee in a relatively low inflation country.

Further, because this ML-based approach makes use of a trainable neural network for final evaluation, the neural network can be refined over time via feedback from auditors, resulting in relatively high reliability and precision in flagging potential fraud cases. In certain embodiments, the neural network can be initially trained using an "indirect" training approach that does not require the exact training target to be known (which is advantageous because the data patterns that indicate payroll fraud are constantly evolving). Thus, via indirect training, the neural network can learn to identify new and emergent fraud patterns that may not have been anticipated by auditors.

The foregoing and other aspects of the present disclosure are described in further detail in the sections that follow.

2. System Architecture

Figure 1:
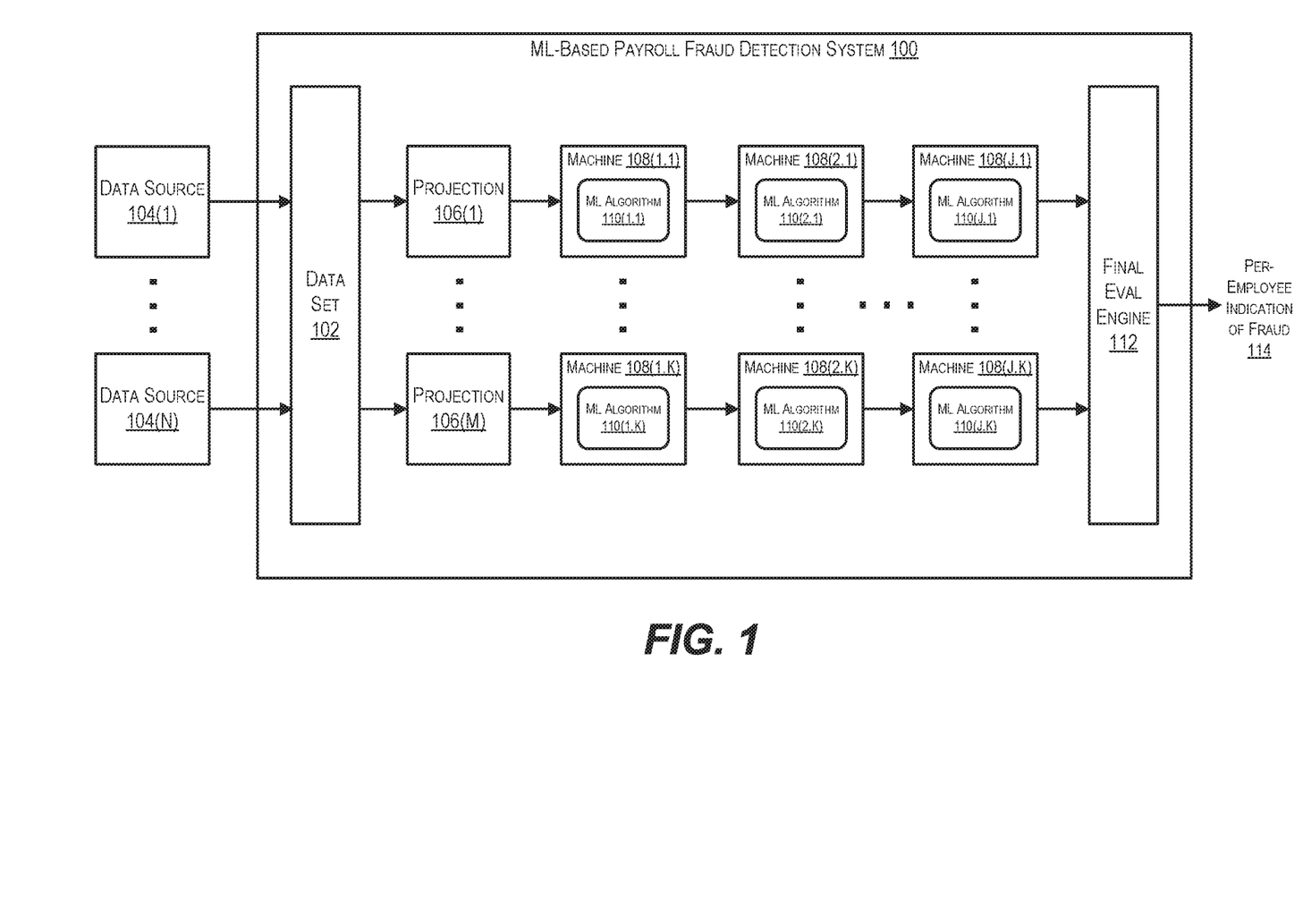
FIGS. 1, 2, 3, and 4 depict variations of an example system architecture according to certain embodiments.

FIG. 1 depicts the general architecture of a ML-based payroll fraud detection system 100 according to certain embodiments of the present disclosure. As shown, system 100 receives a data set 102 from a number of external data sources 104(1)-(N) (e.g., external payroll systems, external HR systems, external banking systems, etc.). Data set 102 can comprise many different types of data, each of which may be relevant to payroll fraud detection. Examples of such data include (but are not limited to):

Employee data
Family data (i.e., family members of employees)
Employee bank data
Payments data (i.e., payments made to employees)
Payments over time
Employee timesheets Because of the variety in the types of data included in data set 102, data set 102 is passed through a number of projections 106(1)-(M). Each projection 106 is designed to transform data set 102 into a format and scope that can be accepted by one or more machines 108, where a "machine" is a computing entity that implements a particular ML algorithm 110. Each machine 108 then executes its corresponding ML algorithm 110 on the transformed data received via projections 106(1)-(M) and generates outputs. These outputs may be subsequently fed into and processed by downstream machines, and the outputs of those downstream machines may be subsequently fed into and processed by further downstream machines in a successive (i.e., chained) manner until one or more terminal machines (e.g., machines 108(J.1)-(J.K)) are reached. Each set of machines whose inputs and outputs are chained together in this way is referred to as an evaluation chain.

In various embodiments, the ML algorithm 110 that is implemented by each machine 108 may be an unsupervised ML algorithm (i.e., an algorithm that does not rely on explicit training via labeled data points) that is designed to find some underlying pattern or structure in its input data as part of the overall payroll fraud detection process. Examples of such unsupervised ML algorithms include anomaly/outlier detection algorithms for finding unusual data points, predictor algorithms (e.g., k-nearest neighbor) for predicting the value of some variable, and clustering algorithms (e.g., hierarchical, k-means, DBSCAN, etc.) for splitting data points into groups based on similarity characteristics.

For instance, machine 108(1.1) may receive as input from projection 106(1) (A) data regarding employees per subsidiary and (B) data regarding the salary increase for each employee over some time period, and execute a predictor algorithm to generate the predicted salary increase per subsidiary. Machine 108(2.1) may then receive this generated output, as well as data (B) from projection 106(1), as inputs and execute an outlier detection algorithm to generate an indication of whether each employee's salary increase is an outlier in the context of the employee's subsidiary.

Once all of the machines/evaluation chains in system 100 have completed their processing, the outputs from the terminal machines (e.g., machines 108(J.1)-(J.K)) are provided as inputs to a neural network-based final evaluation engine 112. In one set of embodiments, final evaluation engine 112 may be implemented as a multi-layered perceptron network with one or more hidden layers. In other embodiments, final evaluation engine 112 may be implemented as a stochastic network. In view of the inputs, final evaluation engine 112 is trained to output, for each employee in data set 102, an indication 114 whether that employee is suspicious—or in other words, likely to have committed payroll fraud. This output can then be provided to human auditors for further investigation and/or sent to another system to trigger one or more actions. For instance, if final evaluation engine 112 flags ten employees as likely fraud suspects, this information may be passed to a computerized audit system that can automatically kick off workflows for initiating payroll audits with respect to those ten flagged employees.

Figure 2:
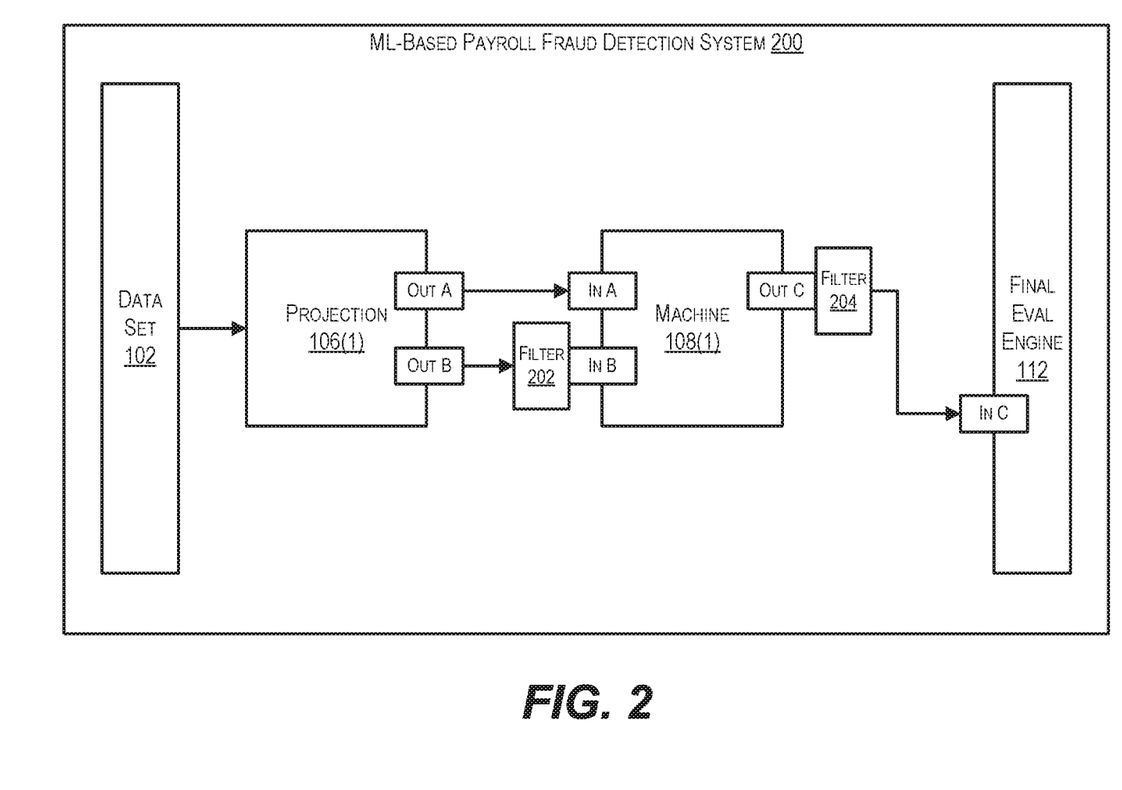

In some embodiments, the output from one projection 106 or machine 108 in system 100 may be filtered before being provided as input to another machine 108 (or to final evaluation engine 112). For example, a machine that executes an outlier detection algorithm for salary increases may detect both high and low outliers. In this case, the low outliers (which are not relevant for fraud detection purposes) can be filtered out from the result set before being passed onward. As another example, a machine may only be interested in employees that have worked overtime on the weekends. In this case, all other employees that do not meet this criterion can be filtered out at the machine input. FIG. 2 depicts a simplified version of system 100 (200) that includes such filters according to an embodiment. In particular, system 200 includes a filter 202 between output B of projection 106(1) and input A of machine 108(1), as well as a filter 204 between output C of machine 108(1) and input C of final evaluation engine 112.

Figure 3:
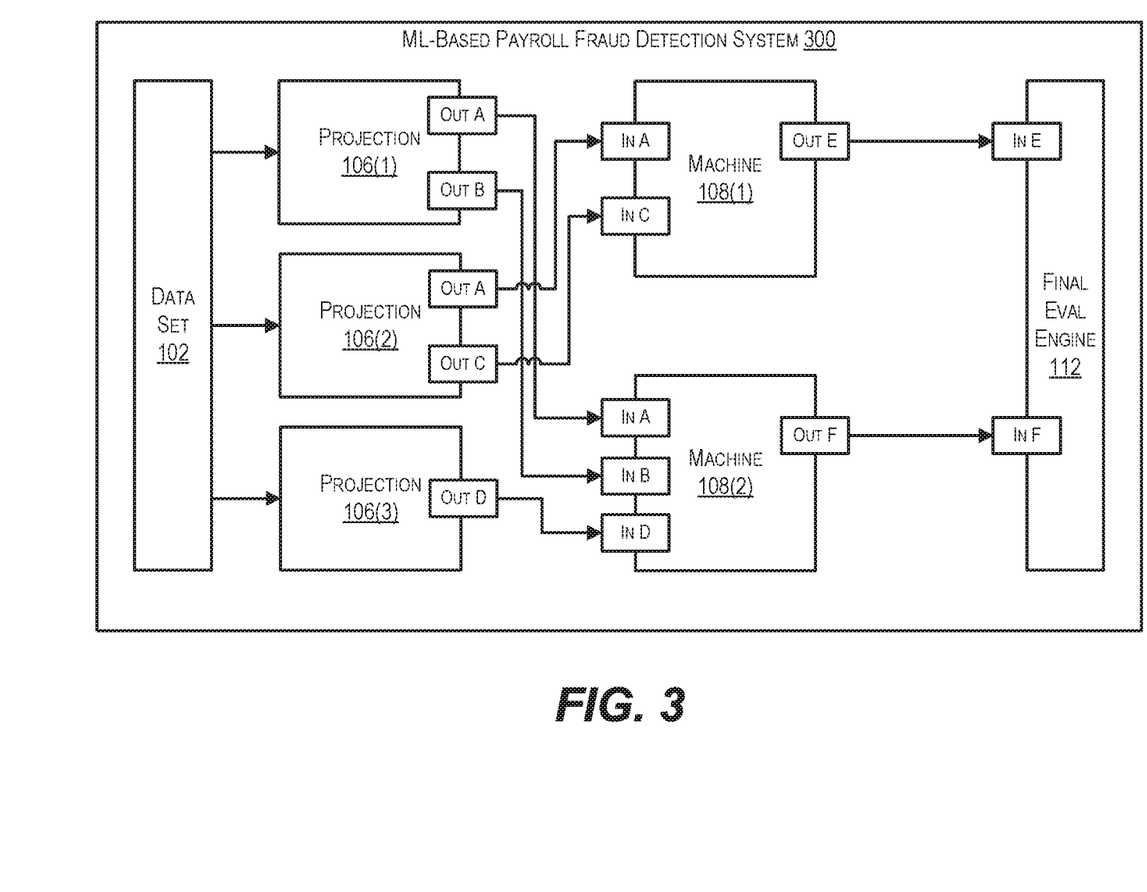

In further embodiments, a given machine 108 may receive inputs from multiple projections or other machines. FIG. 3 depicts another simplified version of system 100 (300) that illustrates this scenario according to an embodiment. As shown in system 300, machine 108(1) receives two inputs A and C from corresponding outputs A and C of projection 106(2). In addition, machine 108(3) receives two inputs A and B from outputs A and B of projection 106(1) and a third input D from output D of projection 106(3).

Figure 4:
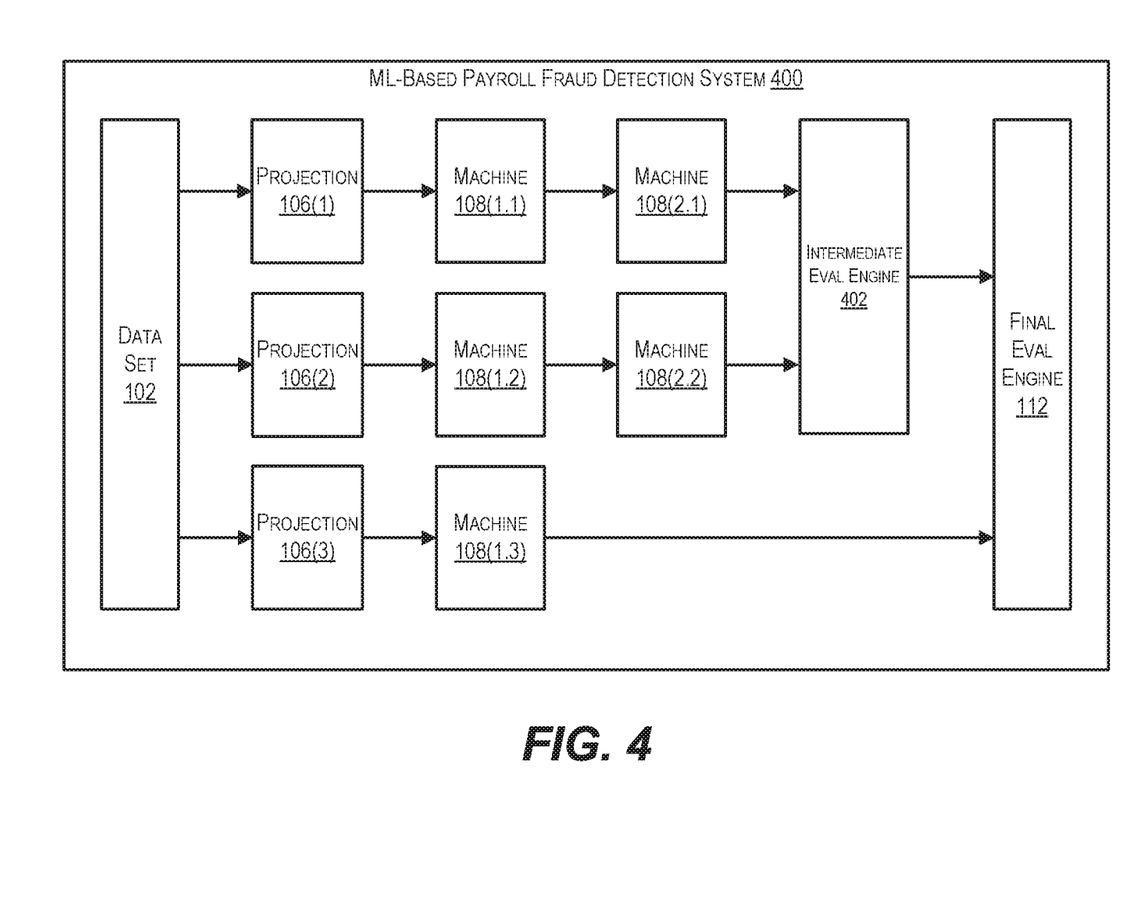

In yet further embodiments, for certain complex scenarios, intermediate neural-network based evaluation engines that operate on the outputs of one or more machines and/or evaluation chains may be employed. The output from such intermediate evaluation engines can then be fed into final evaluation engine 112. This can be useful if the system is interested in determining a summary likelihood of fraud based on some subset of machine/chain outputs (e.g., banking data and history) and providing that summary likelihood as a single probability value to final evaluation engine 112. FIG. 4 depicts yet another simplified version of system 100 (400) that illustrates the use of such intermediate evaluation engines according to an embodiment. In particular, system 400 includes an intermediate evaluation engine 402 that receives inputs from the evaluation chains corresponding to machines [108(1.1), 108(2.1)] and [108(1.2), 108(2.2)] respectively and outputs a summary value to final evaluation engine 112.

With the high-level architecture embodied in ML-based payroll fraud detection system 100 of FIG. 1 (and alternative versions 200, 300, and 400 of FIGS. 2, 3, and 4), a number of technical advantages are realized. First, by utilizing projections 106 to transform the data in data set 102 into the appropriate formats/scope expected by machines 108, system 100 can draw upon data from numerous different data sources in a structured manner in order to inform the fraud detection process. This is important because payroll fraud can manifest itself and be cross-correlated across a wide variety of disparate data types and sources (e.g., employee data, banking data, payment data, timesheet data, termination data, etc.).

Second, by employing machines 108 with corresponding ML algorithms 110, system 100 overrides the need for fixed rules and instead provides a data-driven approach to payroll fraud detection, which is able to learn and make predictions from the data itself rather than from the rule-based expectations of system designers.

Third, given the large number of different data types and sources that serve as inputs to the system, the ability to configure and chain machines 108 to evaluate those various data types in different ways provides a significant degree of flexibility and allows system 100 to react to different data scenarios dynamically (e.g., different outlier calculations of salary increases in high-inflation country A vs. low-inflation country B).

Fourth, through the use of neural network-based final evaluation engine 112, system 100 can become smarter as feedback from auditors is fed back into the engine for training, resulting in more reliable and more precise predictions over time. One caveat with this approach is that the initial training of final evaluation engine 112 can be challenging because (1) the training target is unknown (for example, fraud should show up as a pattern out of the norm, but how do you determine a priori what the norm is?), and (2) in general payroll fraud is rarely detected, so organizations usually do not have sufficient data points of actual fraud for training purposes. However, certain embodiments of the present disclosure address this problem via an indirect training approach (detailed in section 3.2 below). With indirect training, it is possible to train final evaluation engine 112 using a relatively small set of training data that is automatically generated via one or more rules, and at the same time achieve good training results and enable the neural network to learn patterns that are not specifically encoded into those rules.

It should be noted that, in various embodiments, the goal of system 100 is not to generate a list of employees that are definitively guilty of payroll fraud; rather, the goal is to identify a manageable set of likely cases of payroll fraud from the many thousands or millions of data points input into the system, which human auditors or other downstream systems can investigate further. This is well within the capabilities of final evaluation engine 112 and system 100 as a whole via the techniques set forth herein.

3. Workflows

3.1 High-Level System Workflow

Figure 5:
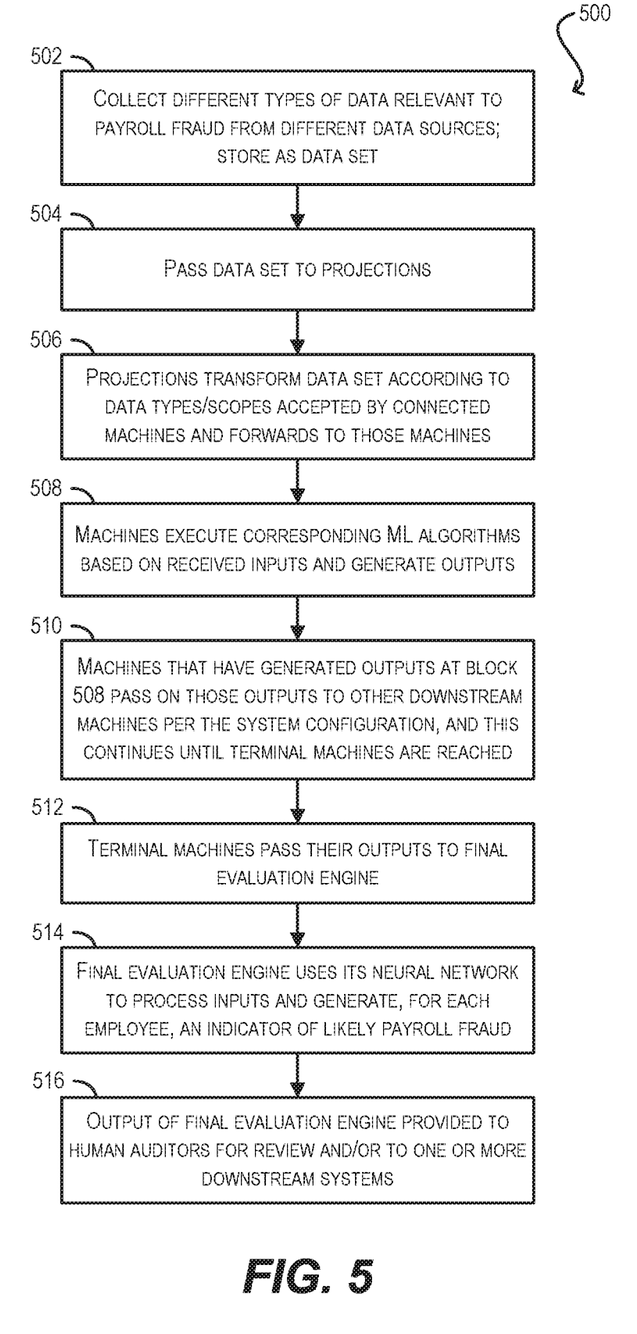
FIG. 5 depicts a flowchart of a high-level system workflow according to certain embodiments.

FIG. 5 depicts, in flowchart form, a high-level workflow 500 that may be executed by system 100 of FIG. 1 to carry out ML-based payroll fraud detection according to certain embodiments. The steps illustrated in FIG. 5 generally align with the functional description of system 100 and its various components presented in section 2 above.

Starting with block 502, system 100 can collect a variety of different types of data that may be relevant to payroll fraud from data sources 104(1)-(N) and temporarily store this collected data in some storage component in the form of data set 102. As mentioned previously, the data collected by system 100 from data sources 104(1)-(N) can include, e.g., employee data, family data, banking data, and so on.

At block 504, system 100 can pass the data in data set 102 to one or more projections 106, which are connected to one or more machines 108 (or in some cases, to final evaluation engine 112) and which maintain information regarding the input parameters expected by those machine(s) (e.g., application programming interface (API) signatures). In response, each projection 106 can use this information to transform data set 102 into the appropriate types and scope expected by its connected machine(s) and forward the transformed data onward to them (block 506). For example, assume data set 102 includes ten employee-related fields but a particular machine M is only interested in two of those fields. In this case, the projection tied to machine M can filter out the eight fields that are not relevant to M and pass on the two remaining fields. As another example, assume data set 102 includes data salary increase data for employees on a month-to-month basis over a twelve month period but machine M takes as input a single salary increase value per employee over the course of the whole year. In this case, the projection tied to machine M can calculate this single annual salary increase value from the month-to-month values included in data set 102 and provide the calculated value to M.

At block 508, each machine 108 that has received all of its expected inputs can execute its corresponding ML algorithm on the input data and generate one or more output values. As mentioned previously, this ML algorithm will typically be an unsupervised ML algorithm that is configured to find some pattern or structure in the underlying data, such as outliers or clusters. The exact nature of the selected algorithm and its inputs and outputs will depend on the use case and design of system 100.

The machines that have generated outputs at block 508 can then pass on those outputs to other downstream machines per the configuration of system 100, and this process of executing machines and passing on the generated outputs to other machines can continue until the terminal machines in the system (i.e., the machines at the ends of the system's evaluation chains) are reached (block 510). As mentioned previously, these evaluation chains are not restricted to linear sequences; instead, machines can feed into others according to a many-to-many relationship. In addition, in some cases filters may be utilized between machines in order to modify the output of one machine before being passed as input into another.

At block 512, the outputs of the terminal machines can be fed into final evaluation engine 112 (note that in some cases, a final projection/normalization component may be inserted between the terminal machines and final evaluation engine 112 as described in the example use cases below). Final evaluation engine 112 can use its neural network to process these inputs and generate, for each employee to which data set 102 pertains, an indicator of whether that employee is suspicious (i.e., has likely committed payroll fraud) (block 514). In one set of embodiments, the output generated by final evaluation engine 112 may take the form of a binary flag (e.g., T or F) or bit value (e.g., 0 or 1) that indicates "non-suspicious" or "suspicious." In other embodiments, the output generated by final evaluation engine 112 may take the form of a continuous probability value (e.g., [0 . . . 1]) indicating the likelihood that the employee is suspicious.

Finally, at block 516, the output of final evaluation engine 112 can be provided to one or more human auditors for review/investigation, and/or provided to one or more downstream systems. In the latter case, the downstream system(s) can evaluate the engine output and automatically trigger one or more actions as appropriate. For example, if the downstream system is a computerized audit system, it can identify the employees that have been flagged as suspicious by system 100 (or whose likelihood of fraud exceeds some threshold) and automatically kick off one or more workflows for initiating payroll audits of those employees (e.g., download appropriate records from the HR and payroll systems, inform auditors, inform legal, etc.). As another example, if the downstream system is a computerized reporting system, it can automatically generate a report summarizing the results for one or more stakeholders in the organization.

3.2 Initial Training Workflow for Final Evaluation Engine

As noted in section 2, the initial training of the neural network of final evaluation engine 112 can be challenging for a number of reasons. First, due to the nature of payroll fraud and fraud in general, it is difficult to know what the target of the training process should be. Fraud should appear as data patterns out of the norm, but the "norm" is ill-defined because fraud can be perpetrated in a number of different ways, some of which cannot be anticipated.

Second, as a general matter, instances of actual, detected payroll fraud are fairly rare on a per-organization basis. Accordingly, the auditors in a given organization typically do not have sufficient training data in order to initially train final evaluation engine 112.

Third, while it is technically possible for human auditors to go through an organization's employee/payroll data and manually label data points for training purposes, the effort of this manual labeling process is too high. A medium-sized organization may have many thousands of data records, which means that it would take an inordinate amount of time for a human auditor to manually label even a small percentage of those records.

Figure 6:
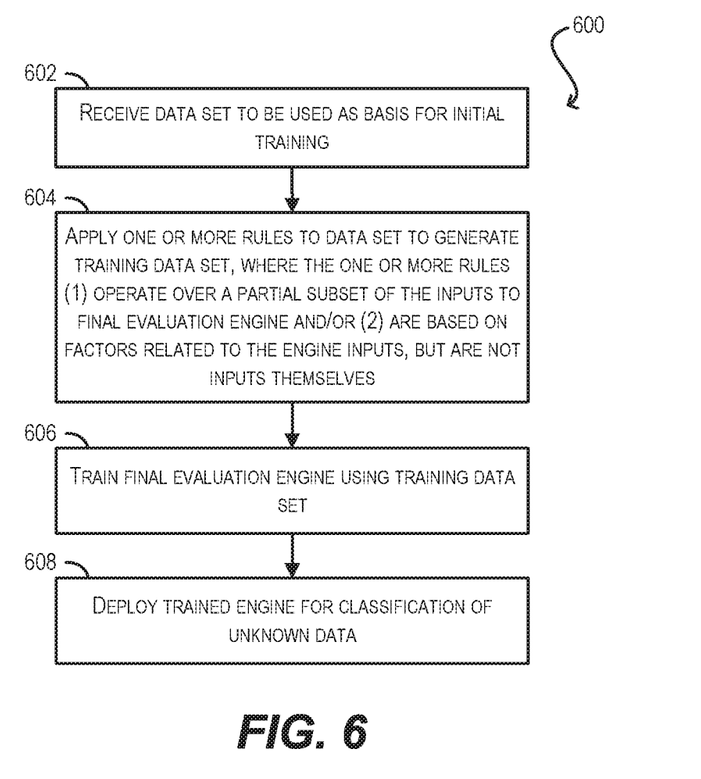
FIG. 6 depicts a flowchart of an initial training workflow according to certain embodiments.

To address the foregoing issues, FIG. 6 depicts a workflow 600 that may be executed by system 100 of FIG. 1 to initially train final evaluation engine 112 using an indirect training approach according to certain embodiments. One advantage of this approach is that it automatically labels data points for training using a set of rules, thereby creating a training data set without requiring the time-consuming task of manual labeling. More importantly, the set of rules that are used in this approach are chosen in a manner that enables final evaluation engine 112 to learn broader data patterns, or in other words data patterns that are not specifically encoded in the rules. This allows engine 112 to identify and flag employees that do not strictly conform to those rules but nonetheless appear suspicious by virtue of certain correlations between their data and the data in the training data set.

Starting with block 602, a training module of system 100 can receive a data set to be used as the basis for initial training, where the data set includes employee-related data relevant for payroll fraud detection. In some embodiments, this data set may be the same as data set 102 evaluated by system 100 per workflow 500 of FIG. 5.

At block 604, the training module can apply one or more rules to the data set in order to label the data points (e.g., employees) in the data set as either suspicious (i.e., likely payroll fraud case) or non-suspicious (i.e., not a likely payroll fraud case). In this manner, the training module can create a training data set out of the original data set.

Significantly, the rules that are applied at block 604 do not correspond directly to all of the inputs of final evaluation engine 112. If the training data set were to be created with such rules, final evaluation engine 112 would simply learn to identify data points that meet those exact rules, and thus engine 112 would provide no advantage over applying the rules as-is for fraud detection.

Instead, the rules that are applied at block 604 are "indirect" rules that meet at least one of two criteria: (1) the rules operate over a partial subset of the inputs to final evaluation engine 112, and/or (2) the rules are based on one or more factors/values that bear some relationship with the inputs to final evaluation engine 112, but are not specifically provided as input to engine 112. In both of these cases, final evaluation engine 112 will learn underlying patterns in the training data that are indicative of fraud, even if those patterns are not specifically defined via the rules (assuming such underlying patterns exist). Thus, with this indirect training approach, final evaluation engine 112 can be effectively trained to detect possible fraud without having a specific training target in mind. An example of indirect training rules of type (1) are discussed in section 4.1 below and an example of indirect training rules of type (2) are discussed in section 4.2 below.

Once the rules have been applied to the original data set and the labeled training data set has been created, the training module can train final evaluation engine 112 using the training data set (block 606). The training module can employ known neural network training methods for this step, such as regression analysis or gradient descent.

Finally, the trained version of final evaluation engine 112 can be deployed for classification of unknown data points per workflow 500 of FIG. 5 (block 608). Further, although not shown in workflow 600, as final evaluation engine 112 is run the outputs of the engine may be reviewed and validated by human auditors. The results of that human review can then be fed back into engine 112 in the form of new training data points, thereby further refining its neural network.

4. Example Use Cases

While the architectural diagrams shown in FIGS. 1-4 and flowcharts shown in FIGS. 5 and 6 provide an overall technical blueprint for an ML-based payroll fraud detection system, the specific data set that is used as input and configuration of the system's projections/machines/final evaluation engine will differ depending on the organization and its desired use cases. For example, some organizations may want to focus their attention on analyzing employees that have triggered one or more compliance-related exceptions, while other organizations may want to look at all employees across countries/subsidiaries based on their month to month salary values.

Two example use cases, along with the specific configuration of system 100 for those use cases, are described in turn below.

4.1 Cumulated Exceptions

Figure 7:
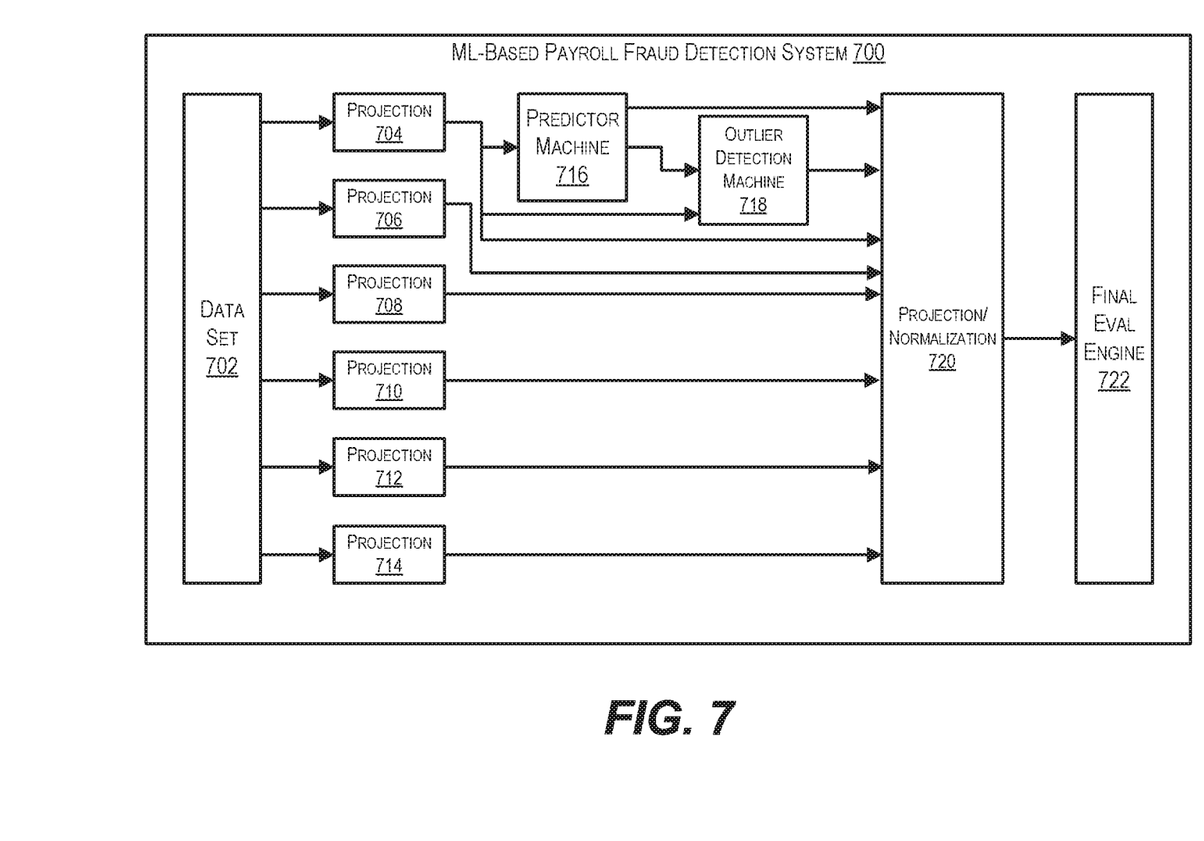
FIGS. 7 and 8 depict example use cases according to certain embodiments.

FIG. 7 depicts an example version 700 of system 100 of FIG. 1 that is designed to find cases of possible payroll fraud among employees that have violated or triggered one or more compliance-related rules according to an embodiment. These employees are referred to as exceptions.

As shown, system 700 collects/receives a data set 702 which can include, among other things, exceptions of the following types:
Employees with salary increases of 10% and over
Employees who have changed their own account/payment data
Employees with multiple bank account changes
Employees that share the same bank account
Employees terminated on fixed contracts where the termination date does not match the contract end date
Employees with payments made to them after termination Data set 702 is subsequently fed into six projections 704, 706, 708, 710, 712, and 714, each of which is configured to transform the data according to the exception types noted above. The transformed data output by projection 704 is fed into an evaluation chain comprising a predictor machine 716 configured to generate a predicted salary increase for each subsidiary of the organization and an outlier detection machine 718 configured to detect employees whose salary increases are significantly higher than the prediction for their subsidiary.

The output of the salary-based evaluation chain, as well as the outputs of projections 704-714, are then provided to a projection/normalization component 720 that is configured normalize all of these values before feeding them as input to final evaluation engine 722. Finally, final evaluation engine 722 is configured to output an indication of likely fraud per employee.

In terms of training the neural network of final evaluation engine 722, in one set of embodiments the initial training set can be created based on the following rule:
Flag an employee as suspicious if he/she has:
 a salary change+any other exception; or
 frequent bank account changes and fixed contract termination; or
 frequent bank account changes and payments after termination; or
 a bank account shared with more than two other employees In addition, final evaluation engine 722 can take as input two additional fields: an outlier flag and the predicted salary increases per subsidiary. This type of rule set (which is a based on a partial subset of the inputs to engine 722) enables final evaluation engine 722 to learn and identify new/broader patterns, to the extent that there are correlations between the inputs that are used for flagging and the inputs that are not used for flagging.

Additional details regarding the inputs/outputs/processing of projections 704-714, machines 716 and 718, and projection/normalization 720 according to certain embodiments are provided in the subsections that follow.

4.1.1 Projection 704
Input:
Salary increase data for all employees on a monthly basis for some time period (e.g., past twelve months)
Requested company code (which identifies a subsidiary)
Filter:
Discard all employees that are not part of the subsidiary identified by the requested company code
Transformation:
Calculate salary increase in percent over the time period per employee
Output:
Set of salary increases in percent for employees in the subsidiary identified by the requested company code 4.1.2 Machine 716
Input:
Set of salary increases in percent for employees in a given subsidiary
ML Algorithm:
k-nearest neighbors estimator
Output:
Predicted salary increase percentage for an employee in the subsidiary 4.1.3 Machine 718
Input:
Set of [employee, salary increase in percent for the employee, predicted salary increase percentage for employee's subsidiary]
Requested outlier percentage
ML Algorithm:
Isolation forest outlier predictor
Output:
Per-employee yes/no outlier identification (e.g., [employee, outlier flag])

4.1.4 Projection 706
Input:
Bank account data over some requested time period
Transformation:
Calculate, for each employee, number of other employees with the same bank account (aggregated over the time period)
Output:
Set of [employee, # of other employees with same bank account]

4.1.5 Projection 708
Input:
Account change data over some requested time period
Transformation:
Calculate, for each employee, number of account changes made (aggregated over the time period)
Output:
Set of [employee, # of account changes]

4.1.6 Projection 710
Input:
Fixed contract termination data over some requested time period
Transformation:
Calculate, for each employee, number of days between termination date and contract end date
Output:
Set of [employee, # of days between termination and contract end]

4.1.7 Projection 712
Input:
Payment after termination data over some requested time period
Transformation:
Calculate, for each employee, number of days between termination date and payment date
Output:
Set of [employee, # of days between termination and payment]

4.1.8 Projection 714
Input:
Employees that have changed their own data over some requested time period
Transformation:
Determine, for each employee, whether the employee has changed his/her own salary information
Output:
Set of [employee, salary change flag]

Figure 8:
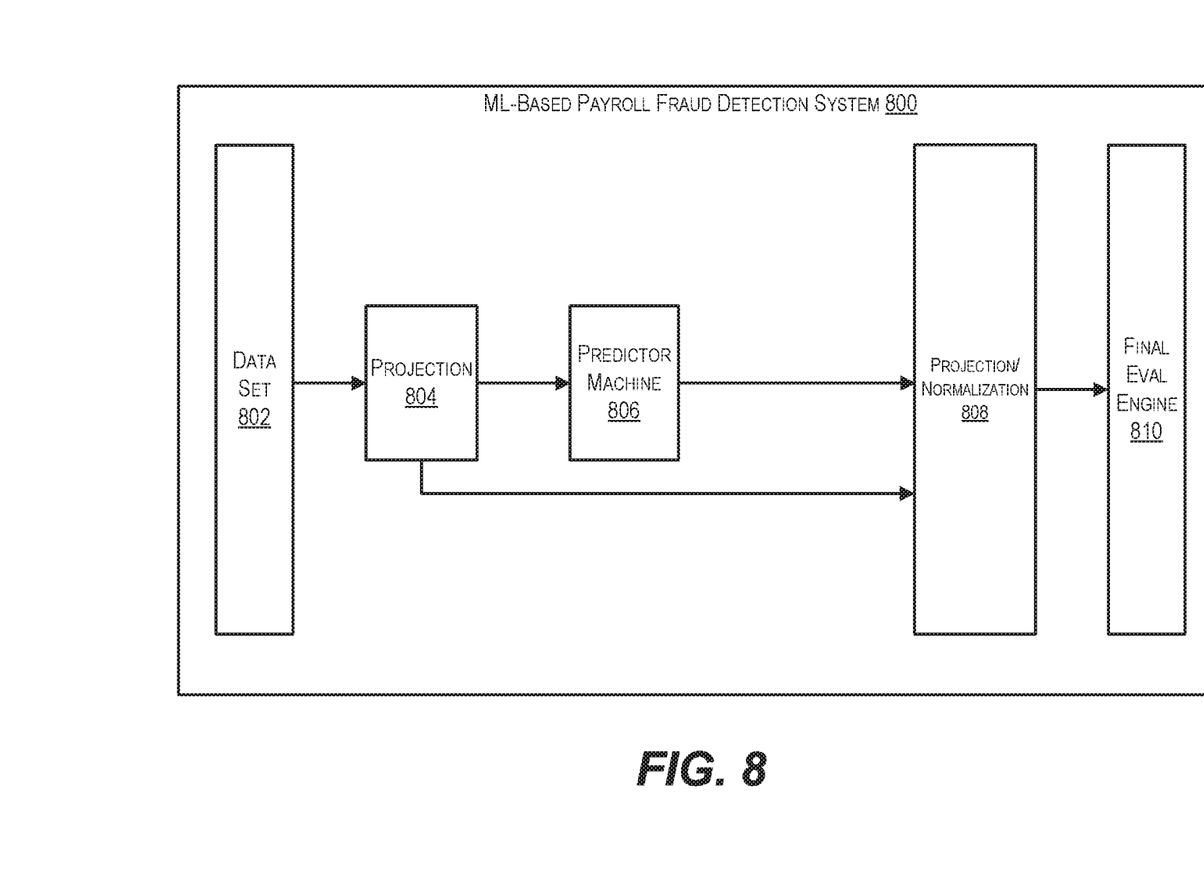

4.1.9 Projection/Normalization 720
Input:
Outputs from machines 716, 718 and projections 704-714
Transformation:
Create normalized vector with the following collated data per employee:
Salary increase % (0 if N/A)
Number of days between termination and contract end (0 if N/A)
Number of days between termination and payment (0 if N/A)
Number of bank account changes (0 of N/A)
Employees with same bank account (0 if N/A)
Changed own data (1 if applicable, 0 if not)
Predicted salary increase for employee's subsidiary (0 if N/A)
Outlier flag (0 if N/A or not an outlier, 1 if outlier)
Output:
Per-employee normalized vector 4.2 Salary increase timing patterns FIG. 8 depicts an example version 800 of system 100 of FIG. 1 that is designed to find cases of possible payroll fraud based on the timing and sizes of employee salary increases according to an embodiment.

As shown, system 800 collects/receives a data set 802 that can include, for each of a number of employees, salary change information for that employee (e.g., old salary and new salary) on a month to month basis over some time period (e.g., last twelve months). Data set 802 is fed into a projection 804 that is configured to transform the data and output a salary increase percentage per employee per month. This output is provided as input to a machine 806 that is configured to generate a predicted salary increase per subsidiary of the organization. The outputs of machine 806 and projection 804 are then fed into a projection/normalization component 808 that is configured to normalize all of the data sets before feeding them as input to final evaluation engine 810. Finally, final evaluation engine 810 is configured to output an indication of likely fraud per employee.

In terms of training the neural network of final evaluation engine 810, in one set of embodiments the initial training set can be created based on the following rule:
Flag an employee as suspicious if his/her total salary increase over the last twelve months is three times (or more) greater than the expected salary increase for his/her subsidiary This type of rule set (which is a based on factors that are related to inputs to engine 810 but are not direct inputs) enables final evaluation engine 810 to learn and identify timing patterns that are typical for employees with very high salary increases, including employees that may not match the specific training rule noted above.

Additional details regarding the inputs/outputs/processing of projection 804, machine 806, and projection/normalization 808 according to certain embodiments are provided in the subsections that follow.

4.2.1 Projection 804
Input:
Salary increase data for all employees on a monthly basis for some time period (e.g., past twelve months)
Transformation:
Calculate salary increase in percent over the time period per employee
Output:
Set of employee salary increases in percent per month 4.2.2 Machine 806
Input:
Set of salary increases in percent for employees in a given subsidiary
ML Algorithm:
k-nearest neighbors estimator
Output:
Predicted salary increase percentage for an employee in the subsidiary 4.2.3 Projection/Normalization 808
Input:
Outputs from projection 804 and machine 806
Transformation:
Create normalized vector with the following collated data per employee:
Predicted salary increase percentage
Salary increase percentage per month
Output:
Per-employee normalized vector 5. Microservices-Based Implementation In terms of the physical implementation of system 100 of FIG. 1, in one set of embodiments system 100 can be implemented as a set of microservices residing in the cloud, where a "microservice" is a software-based service that accomplishes some portion of a larger application (e.g., system 100 in this case). For instance, each projection 106 and machine 108 can be implemented as a microservice, while final evaluation engine 112 can be implemented as a microservice or as some other cloud-based component/service. The routing of data between these entities can be accomplished via the invocation of published APIs for each microservice. In addition, the routing of data between data sources 104/data set 102 and the first layer of projections/machines in the system, as well as between the terminal machines and final evaluation engine 112, can be accomplished via appropriate data collectors/queues.

With this microservices-based design, system 100 can be deployed in a modular and extensible fashion. For example, each projection/machine can be easily updated as needed by deploying new versions of their corresponding microservices. Further, new projections/machines can be easily added to system 100 by deploying brand new microservices, including new projections/machines that are specific to certain customers or organizations.

6. Example Computer System

Figure 9:
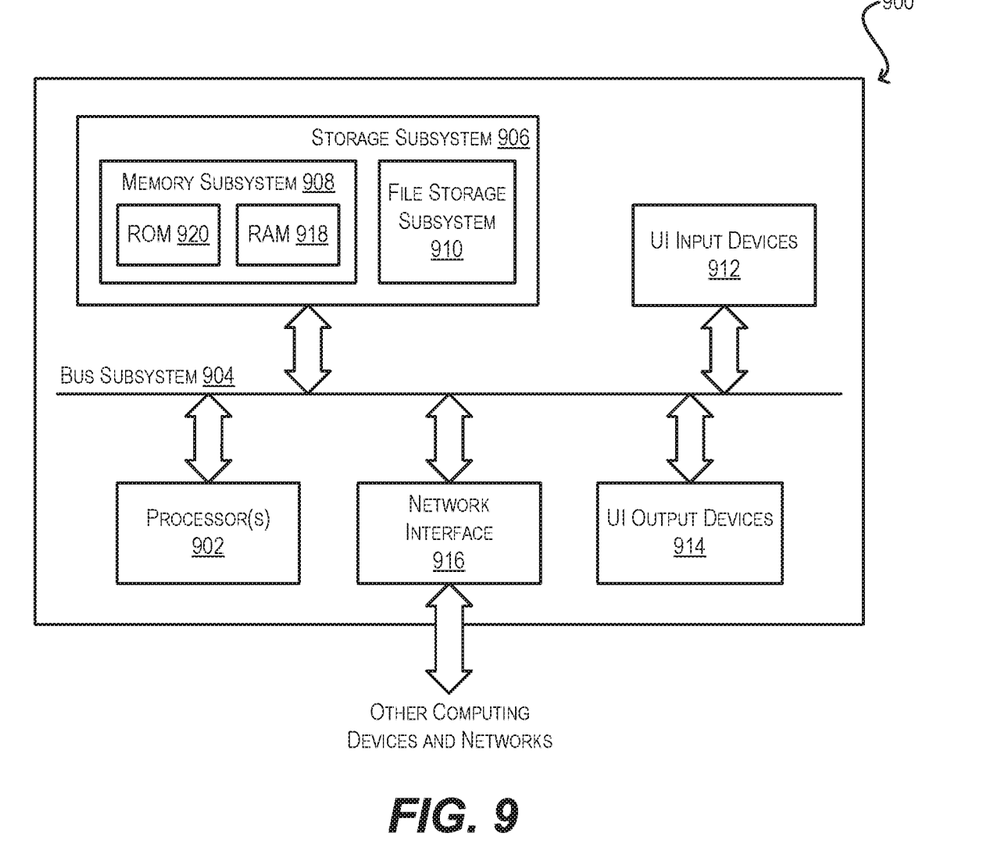
FIG. 9 depicts an example computer system according to certain embodiments.

FIG. 9 depicts an example computer system 900 according to certain embodiments. Computer system 900 may be used to run any of the software components, including system 100 of FIG. 1 or the constituent components thereof, described in the foregoing disclosure.

As shown, computer system 900 can include one or more processors 902 that communicate with a number of peripheral devices via a bus subsystem 904. These peripheral devices can include a storage subsystem 906 (comprising a memory subsystem 908 and a file storage subsystem 910), user interface input devices 912, user interface output devices 914, and a network interface subsystem 916.

Bus subsystem 904 can provide a mechanism for letting the various components and subsystems of computer system 900 communicate with each other as intended. Although bus subsystem 904 is shown schematically as a single bus, alternative embodiments of the bus subsystem can utilize multiple busses.

Network interface subsystem 916 can serve as an interface for communicating data between computer system 900 and other computing devices or networks. Embodiments of network interface subsystem 916 can include wired (e.g., coaxial, twisted pair, or fiber optic Ethernet) and/or wireless (e.g., Wi-Fi, cellular, Bluetooth, etc.) interfaces.

User interface input devices 912 can include a touchscreen incorporated into a display, a keyboard, a pointing device (e.g., mouse, touchpad, etc.), an audio input device (e.g., a microphone), and/or other types of input devices. In general, use of the term "input device" is intended to include all possible types of devices and mechanisms for inputting information into computer system 900.

User interface output devices 914 can include a display subsystem (e.g., a flat-panel display), an audio output device (e.g., a speaker), and/or the like. In general, use of the term "output device" is intended to include all possible types of devices and mechanisms for outputting information from computer system 900.

Storage subsystem 906 can include a memory subsystem 908 and a file/disk storage subsystem 910. Subsystems 908 and 910 represent non-transitory computer-readable storage media that can store program code and/or data that provide the functionality of various embodiments described herein.

Memory subsystem 908 can include a number of memories including a main random access memory (RAM) 918 for storage of instructions and data during program execution and a read-only memory (ROM) 920 in which fixed instructions are stored. File storage subsystem 910 can provide persistent (i.e., non-volatile) storage for program and data files and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 900 is illustrative and many other configurations having more or fewer components than computer system 900 are possible.

The above description illustrates various embodiments of the present disclosure along with examples of how aspects of the present disclosure may be implemented. The above examples and embodiments should not be deemed to be the only embodiments, and are presented to illustrate the flexibility and advantages of the ML-based payroll fraud detection techniques disclosed herein and as defined by the following claims.

For example, although certain embodiments have been described with respect to particular process flows and steps, it should be apparent to those skilled in the art that the scope of the present disclosure is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the present disclosure as set forth in the following claims.

What is claimed is:

1. A system comprising:
one or more first computers executing one or more projections;
one or more second computers executing one or more machine learning (ML) machines; and one or more third computers executing a neural network-based evaluation engine,
  wherein at least one projection in the one or more projections receives data from a data set relevant to detection of payroll fraud in an organization and transforms the data into a format and scope expected by at least one ML machine in the one or more ML machines,
  wherein the at least one ML machine receives the transformed data from the at least one projection, executes an ML algorithm based on the transformed data, and generates output data, and
  wherein the neural network-based evaluation engine receives the output data from the at least one ML machine, processes the received output data via a neural network, and generates, for each organization employee represented in the data set, an indication of whether the employee is likely to have committed payroll fraud.

2. The system of claim 1 wherein the data set includes data collected from an external payroll system, an external human resources (HR) system, and an external banking system.

3. The system of claim 1 wherein the at least one projection transforms the data from the data set into formats and scopes expected by a plurality of ML machines.

4. The system of claim 1 wherein the at least one ML machine also receives input data from another ML machine in the one or more ML machines and executes the ML algorithm based on both the transformed data received from the at least one projection and the input data received from said another ML machine.

5. The system of claim 1 wherein the neural network-based evaluation engine receives output data generated by a plurality of ML machines and processes the output data generated by the plurality of ML machines via the neural network.

6. The system of claim 1 wherein the ML algorithm is an unsupervised algorithm that is designed to determine an underlying pattern or structure in the transformed data.

7. The system of claim 1 wherein the transformed data includes salary increase data for employees in the organization and wherein the ML algorithm determines a predicted salary increase value per employee.

8. The system of claim 1 wherein the at least one ML machine passes the predicted salary increase value per employee to another ML machine in the one or more ML machines, and wherein said another ML machine executes another ML algorithm that identifies employees with unusually high salary increases.

9. The system of claim 1 wherein the neural network is trained using a training data set that is automatically generated from the data set.

10. The system of claim 1 wherein the training data set is automatically generated by applying one or more rules to the data set that label each employee in the data set as being a likely suspect of payroll fraud or not, and wherein the one or more rules are based on a subset of inputs accepted by the neural network.

11. The system of claim 1 wherein the training data set is automatically generated by applying one or more rules to the data set that label each employee in the data set as being a likely suspect of payroll fraud or not, and wherein the one or more rules are based on one or more factors that are related to inputs accepted by the neural network but do not correspond to the inputs themselves.

12. The system of claim 1 wherein the indication of whether the employee is likely to have committed payroll fraud is a binary flag or a bit value.

13. The system of claim 1 wherein the indication of whether the employee is likely to have committed payroll fraud is a continuous probability value ranging from 0 to 1.

14. The system of claim 1 wherein the indications generated by the neural network-based evaluation engine are provided to one or more human auditors for review.

15. The system of claim 1 wherein the indications generated by the neural network-based evaluation engine are passed to a downstream computing system that takes one or more actions based on the indications.

16. The system of claim 15 wherein the one or more actions include, for each employee indicated as being likely to have committed payroll fraud, automatically initiating a workflow for auditing the employee.

17. The system of claim 1 wherein each of the one or more projections and each of the one or more ML machines is implemented as a cloud-based microservice.

18. A non-transitory computer readable medium having stored thereon program code executable by one or more computer systems, the program code comprising:
  code for executing one or more projections;
  code for executing one or more machine learning (ML) machines; and
  code for executing a neural network-based evaluation engine,
  wherein at least one projection in the one or more projections receives data from a data set relevant to detection of payroll fraud in an organization and transforms the data into a format and scope expected by at least one ML machine in the one or more ML machines,
  wherein the at least one ML machine receives the transformed data from the at least one projection, executes an ML algorithm based on the transformed data, and generates output data, and
  wherein the neural network-based evaluation engine receives the output data from the at least one ML machine, processes the received output data via a neural network, and generates, for each organization employee represented in the data set, an indication of whether the employee is likely to have committed payroll fraud.

19. The non-transitory computer readable medium of claim 18 wherein the program code further comprises:
  code for evaluating the indications generated by the neural network and invoking one or more automated actions based on the evaluating.

20. A method comprising:
  training, by a computer system, a neural network to determine whether employees of an organization are payroll fraud suspects, the training being based on a training data set generated by applying one or more rules to payroll-related data maintained by the organization, the one or more rules being derived from:
    a subset of inputs accepted by the neural network; or
    one or more factors that are related to the inputs accepted by the neural network but do not correspond to the inputs themselves;
  collecting, by the computer system, a data set pertaining to a subset of the employees;
  processing, by the computer system, the data set using one or more machine learning (ML) algorithms;
  providing, by the computer system, outputs of the ML algorithms as the inputs to the trained neural network; and generating, via the trained neural network for each of the subset of employees, an indication of whether the employee is likely to have committed payroll fraud.

\* \* \* \* \*